(12) United States Patent
Takahashi

(10) Patent No.: US 7,345,711 B2
(45) Date of Patent: Mar. 18, 2008

(54) VIDEO SIGNAL IMPROVING CIRCUIT

(75) Inventor: Ken Takahashi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 553 days.

(21) Appl. No.: 11/007,273

(22) Filed: Dec. 9, 2004

(65) Prior Publication Data

US 2005/0157213 A1 Jul. 21, 2005

(30) Foreign Application Priority Data

Jan. 16, 2004 (JP) .............................. 2004-008646

(51) Int. Cl.
*H04N 5/21* (2006.01)
(52) U.S. Cl. ........................ 348/625; 348/606
(58) Field of Classification Search ................ 348/625, 348/630, 606, 607, 624; 382/254, 275, 260–266; H04N 5/21

See application file for complete search history.

(56) References Cited

U.S. PATENT DOCUMENTS

| 5,146,319 A | 9/1992 | Engel et al. | |
| 5,469,225 A * | 11/1995 | Hong | 348/625 |
| 5,920,357 A | 7/1999 | Ohara | |
| 5,959,693 A * | 9/1999 | Wu et al. | 348/625 |
| 6,650,792 B1 * | 11/2003 | Aida et al. | 348/625 |

FOREIGN PATENT DOCUMENTS

| JP | 2-4367 | 1/1990 |
| JP | 4-38077 | 2/1992 |
| JP | 10-150582 | 6/1998 |

\* cited by examiner

*Primary Examiner*—Sherrie Hsia
(74) *Attorney, Agent, or Firm*—Oblon, Spivak, McClelland, Maier & Neustadt, P.C.

(57) ABSTRACT

A video signal improving circuit comprises an input section which receives a video signal; a delay circuit which delays the video signal to generate a plurality of delayed video signals which have delayed times different from one another; an improving signal producing circuit which generates, as an improving signal, an improving amount for performing a transient improvement on the video signal based upon an original video signal before delay and the plurality of delayed video signals; a band-limiting filter which performs a frequency band limitation on the improving signal; a timing correcting circuit which causes timings of any one of the plurality of delayed video signals and the improving signal which has passed through the band-limiting filter to match with each other; and an adder which adds the improving signal which has passed through the band-limiting filter to the delayed video signal which has passed through the timing correcting circuit.

4 Claims, 11 Drawing Sheets

VIDEO SIGNAL IMPROVING CIRCUIT

CROSS-REFERENCE TO RELATED APPLICATIONS

This application is based upon and claims the benefit of priority from the prior Japanese Patent Applications No. 2004-8646, filed on Jan. 16, 2004, the entire contents of which are incorporated herein by reference.

BACKGOUND OF THE INVENTION

1. Field of the Invention

The present invention relates to a video signal improving circuit.

2. Background Art

In order to clarify an edge of an image and display the image sharply, a transient improvement is performed on a video signal such as a luminance signal or a color-difference signal. FIG. 14 is a diagram showing a rising portion of a video signal before and after transient improvement is performed. A video signal X is a video signal before a transient improvement and a video signal Y is a video signal after the transient improvement. When a gradual-rising signal, such as the video signal X, is used, an edge of an image is blurred to become unclear, as shown in FIG. 15. On the other hand, when a sharp-rising signal, such as the video signal Y, is used, an edge of an image becomes clear, as shown in FIG. 16.

The transient improvement includes a luminance transient improvement to a luminance signal and a color-difference transient improvement to a color-difference signal. The luminance transient improvement is called LTI (Luminance Transient Improver), SRT (Super Real Transient), or the like. The color-difference transient improvement is called CTI (Color Transient Improver), color SRT (Color Super Real Transient) or the like.

In general, a frequency band of a video signal improved by the transient improvement depends on characteristics of a transient improving circuit. For this reason, the transient improving circuit performs transient improvement on even signals in a frequency band which does not require transient improvement. At this time, for example, when a jitter occurs in a low frequency band which does not require transient improvement, an edge of the jitter is also made clear due to the transient improvement, which results in such a problem that the jitter becomes visible easily (refer to Japanese Paten Application Laid-Open (JP-A) No. 10-150582).

SUMMARY OF THE INVENTION

A video signal improving circuit according to an embodiment of the invention comprises an input section which receives a video signal; a delay circuit which delays the video signal to generate a plurality of delayed video signals which have delayed times different from one another; an improving signal producing circuit which generates, as an improving signal, an improving amount for performing a transient improvement on the video signal based upon an original video signal before delay and the plurality of delayed video signals; a band-limiting filter which performs a frequency band limitation on the improving signal; a timing correcting circuit which causes timings of any one of the plurality of delayed video signals and the improving signal which has passed through the band-limiting filter to match with each other; and an adder which adds the improving signal which has passed through the band-limiting filter to the delayed video signal which has passed through the timing correcting circuit.

A video signal improving circuit according to another embodiment of the invention comprises an input section which receives a video signal; a delay circuit which delays the video signal to generate a plurality of delayed video signals having delayed times different from one another; a band-limiting filter which performs a frequency band limitation on an original video signal before delay and the plurality of delayed video signals; an improving signal producing circuit which generates, as an improving signal, an improving amount for performing a transient improvement on the video signal based upon the original video signal and the plurality of delayed video signals which have passed through the band-limiting filter; a timing correcting circuit which causes timings of any one of the plurality of delayed video signals and the improving signal to match with each other; and an adder which adds the improving signal to the delayed video signal which has passed through the timing correcting circuit.

A video signal improving circuit according to further embodiment of the invention comprises an input section which receives a video signal; a first delay circuit which delays the video signal to generate a plurality of delayed video signals having delayed times different from one another; an improving signal producing circuit which generates, as an improving signal, an improving amount for performing a transient improvement on the video signal based upon an original video signal before delay and the plurality of delayed video signals; an amplifier circuit amplifying the improving amount; a frequency detecting circuit which detects a frequency of the plurality of delayed video signals to reduce a gain of the amplifier circuit in the case that the detected frequency belongs to a frequency band which does not require the transient improvement; and an adder which adds the improving signal amplified by the amplifier circuit to one of the plurality of video signals.

DETAILED DESCRIPTION OF THE INVENTION

Figure 1:
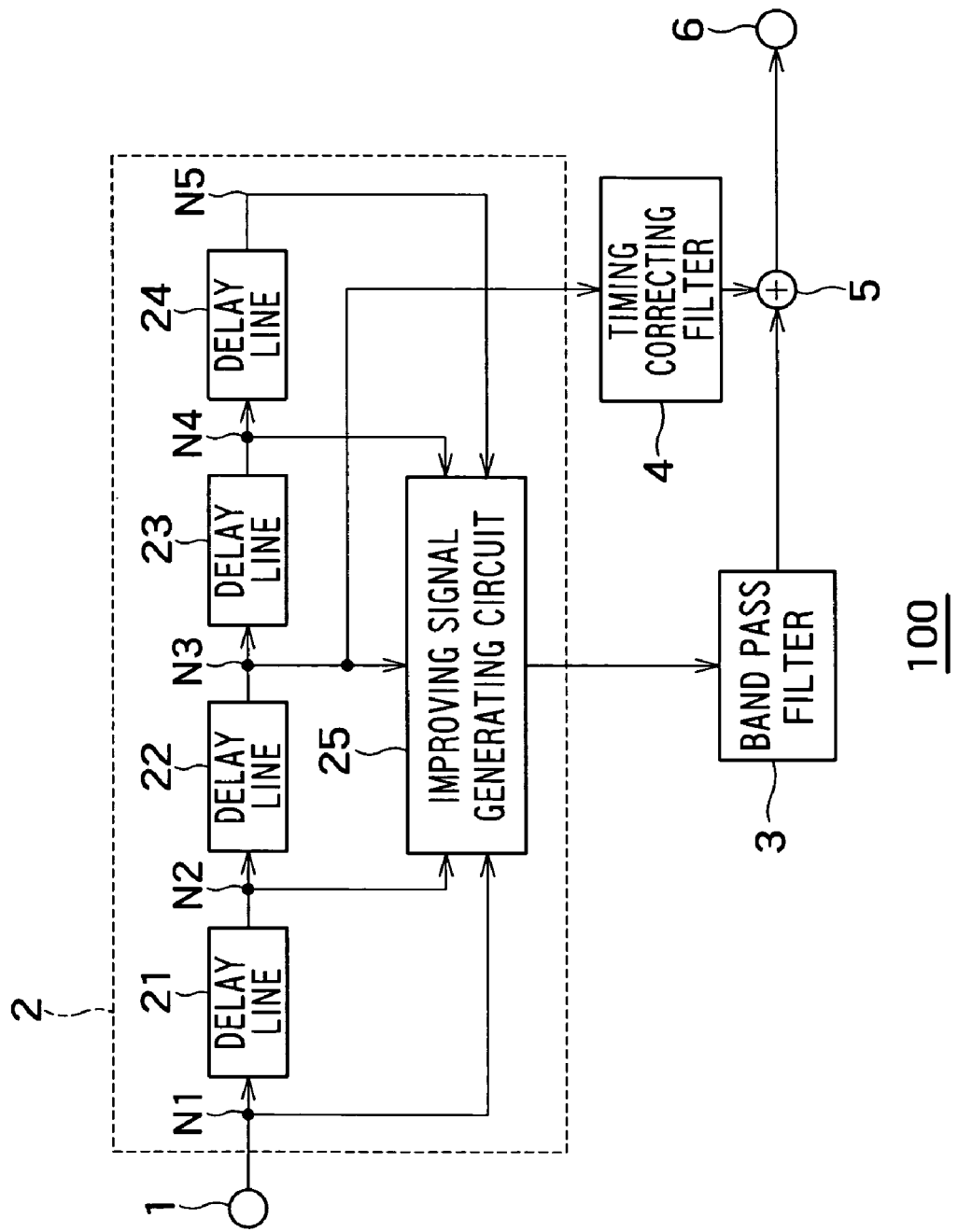
FIG. 1 is a block diagram of a video signal improving circuit 100 according to a first embodiment of the present invention.

Embodiments according to the present invention will be explained below with reference to the drawings. The present invention is not limited to the embodiments. Each of video signal improving circuits according to the following embodiments modifies a gain of an improving amount of a transient improvement based upon a frequency of an input video signal. Thereby, the transient improvement is performed on a video signal requiring improvement and an improving amount of transient improvement can be reduced to other video signals. The video signal improving circuit is embedded in an analog television receiver, a digital television receiver or the like, and can be used for a video signal processing in the television receiver, a monitor device therein or the like. In the drawings, same reference numerals denote same or similar elements or members.

Figure 14:
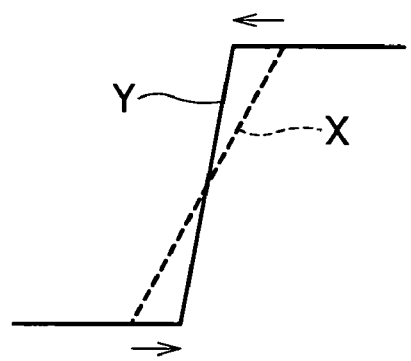
FIG. 14 is a diagram showing a rising portion of a video signal before and after transient improvement is performed.
Figure 15:
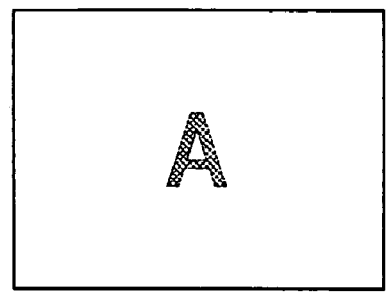
FIG. 15 is a diagram showing an image before transient improvement is performed.
Figure 16:
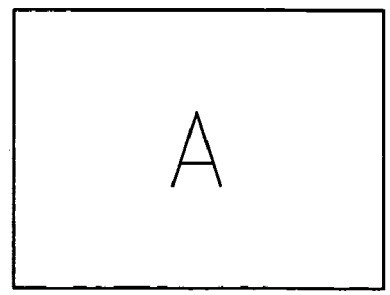
FIG. 16 is a diagram showing an image after transient improvement is performed.

FIG. 1 is a block diagram of a video signal improving circuit 100 according to a first embodiment of the present invention. The video signal improving circuit 100 comprises a transient improving circuit 2, a band-limiting filter (hereinafter, also called "BPF (Band Pass Filter)") 3, and a timing correcting filter 4. The transient improving circuit 2 includes delay lines 21 to 24, and an improving signal producing circuit 25. As shown in FIG. 14, the transient improving circuit 2 improvs a video signal so as to make a slope of a rising or falling of the video signal steeper.

The delay lines 21 to 24 are connected from an input terminal 1 in series. The delay line 21 delays an original video signal inputted from the input terminal 1 to output a first delayed video signal. The delay line 22 further delays the first delayed video signal from the delay line 21 to output a second delayed video signal. The delay line 23 further delays the second delayed video signal from the delay line 22 to output a third delayed video signal. The delay line 24 further delays the third delayed video signal from the delay line 23 to output a fourth delayed video signal. In order to perform transient improvement easily, it is preferable that the delay lines 21 to 24 delay the video signals by the same delay amount, respectively. The video signal is constituted of, for example, a color-difference signal and a luminance signal, or, RGB signals.

A node between the input terminal 1 and the delay line 21 is defined as N1, a node between the delay line 21 and the delay line 22 is defined as N2, a node between the delay line 22 and the delay line 23 is defined as N3, a node between the delay line 23 and the delay line 24 is defined as N4, and a node between the delay line 24 and the improving signal producing circuit 25 is defined as N5. The improving signal producing circuit 25 is connected to the node N1 to N5, respectively. Thereby, the improving signal producing circuit 25 can be inputted with the original video signal, and the first to fourth delayed video signals. The improving signal producing circuit 25 performs arithmetic operation on these signals using the original video signal and the first to fourth delayed video signals to generate an improving signal indicating an improving amount based upon a slope of a rising or falling of the video signal.

In general, a frequency of a video signal to be subjected to transient improvement is determined according to a difference of a delay amount. In detail, when improvement is performed on a video signal with a low frequency, the improving signal producing circuit 25 generates an improving signal by using a plurality of video signals forming a large difference(s) in delay amount among them. In this case, for example, the improving signal producing circuit 25 uses the original video signal (N1), the second delayed video signal (N3), and the fourth delayed video signal (N5) to calculate a difference between the original video signal and the second delayed video signal and a difference between the second delayed video signal and the fourth delayed video signal. Further, the improving signal producing circuit 25 generates an improving signal by performing such an operation as differentiating these differences.

On the other hand, when improvement is performed on a video signal with a high frequency, the improving signal producing circuit 25 generates an improving signal using a plurality of video signals forming a small difference(s) in delay amount. The improving signal producing circuit 25 uses the first delayed video signal (N2), the second delayed video signal (N3), and the third delayed video signal (N4) to calculate a difference between the first delayed video signal and the second delayed video signal and a difference between the second delayed video signal and the third delayed video signal. Further, the improving signal producing circuit 25 obtains an improving signal by performing such a processing as differentiating these differences.

Figure 2:
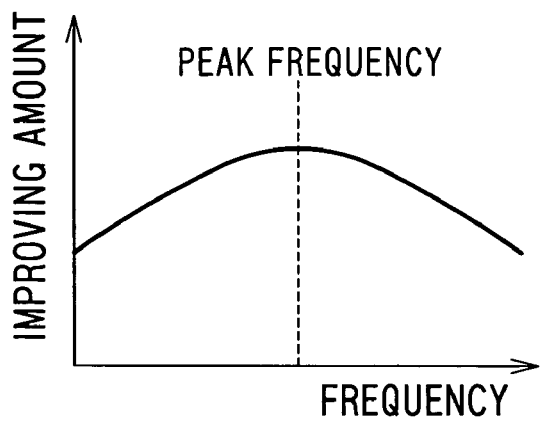
FIG. 2 is a graph showing an improving amount of an improving signal to a frequency of a video signal.

FIG. 2 is a graph showing an improving amount of an improving signal to a frequency of a video signal. A peak frequency is a frequency of a video signal to be subjected to transient improvement. As shown in FIG. 2, improving amount occurs even in frequencies other than the peak frequency. That is, when a video signal is subjected to a transient improvement by using an improving signal outputted from the improving signal producing circuit 25, video signals with frequencies other than the peak frequency are also subjected to a transient improvement.

Figure 3:
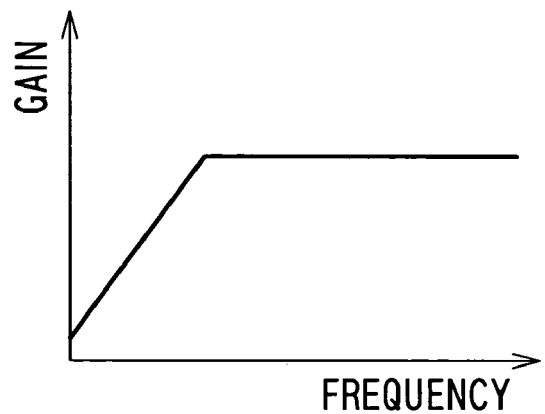
FIG. 3 is a graph showing a gain characteristic of the band-limiting filter 3.

Therefore, a band-limiting filter 3 connected to the improving signal producing circuit 25 is inputted with the improving signal from the improving signal producing circuit 25 to convert a gain of the improving signal dependent on a frequency. A gain characteristic of the band-limiting filter 3 is shown in FIG. 3. In this embodiment, the band-limiting filter 3 is a high pass filter. Therefore, the improving signal is limited regarding a low frequency band lower than the peak frequency.

Figure 4:
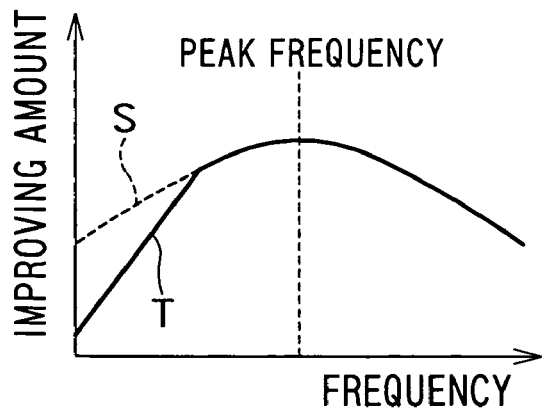
FIG. 4 is a graph showing an improving amount of an improving signal which has passed through the band-limiting filter 3.

FIG. 4 is a graph showing an improving amount of an improving signal which has passed through the band-limiting filter 3. A broken line S shows an improving signal before it passes through the band-limiting filter 3, and a solid line T shows an improving signal after it passes through the band-limiting filter 3. Since the band-limiting filter 3 is the high pass filter, the improving amount in the low frequency band is reduced in this manner.

The timing correcting filter 4 is connected between the node N3 and an adder 5. The timing correcting filter 4 is inputted with the second delayed video signal to output the video signal to the adder 5. At this time, the timing correcting filter 4 delays the second delayed video signal. This delay is performed for synchronizing the second delayed video signal with the improving signal which has passed through the band-limiting filter 3, because the improving signal is delayed by passing of the improving signal through the band-limiting filter 3. The timing correcting filter 4 may be constituted of, for example, a delay line(s).

The adder 5 is connected to the band-limiting filter 3 and the timing correcting filter 4, respectively, and is inputted with the improving signal from the band-limiting filter 3 and with the second delayed video signal from the timing correcting filter 4. Further, the adder 5 adds the improving signal and the second delayed video signal to output the added result from an output terminal 6. Thereby, a video signal improved such as a video signal Y shown in FIG. 14 is outputted from the output terminal 6.

A reason for inputting the second delayed video signal into the timing correcting circuit 4 will be explained below. As described above, when a video signal is a signal with a low frequency, the improving signal producing circuit 25 generates an improving signal by using the original video signal, the second delayed video signal, and the fourth delayed video signal. When a video signal is a signal with a high frequency, the improving signal producing circuit 25 generates an improving signal by using the first delayed video signal, the second delayed video signal, and the third delayed video signal. In either case, the second delayed video signal is an intermediate signal among these delayed video signals which has an intermediate value between the original video signal and a delayed video signal delayed in the maximum. That is, the both of the cases use a signal delayed from the second delayed video signal by a fixed time and a signal advanced from the second delayed video signal by the same fixed time. As shown in FIG. 14, therefore, it is necessary to use the second delayed video signal in order to improve a slope of a rising or a falling of a video signal about a center thereof in an arrow direction.

According to this embodiment, as shown in FIG. 4, an improving amount to video signals belonging to a frequency band which does not require transient improvement can be reduced. Thereby, for example, even when a jitter occurs in a video signal belonging to a low frequency band, the jitter is not enhanced on a screen.

In this embodiment, though the high pass filter is used as the band-limiting filter 3, a band pass filter or a low pass filter may be used as the band-limiting filter 3. When the low pass filter is used as the band-limiting filter 3, an improving amount to a video signal belonging to a high frequency band exceeding a peak frequency thereof can be reduced. When the band pass filter is used as the band-limiting filter 3, an improving amount to a video signal belonging to a lower frequency band lower than the peak frequency and belonging to a high frequency band exceeding the peak frequency can be reduced. Thereby, even when noises or the like occur in a high frequency band, or both of a high frequency band and a low frequency band, the video signal improving circuit 100 according to the embodiment can improve transient of a video signal with an intended frequency to display an image sharply without enhancing the noises.

(Second Embodiment)

Figure 5:
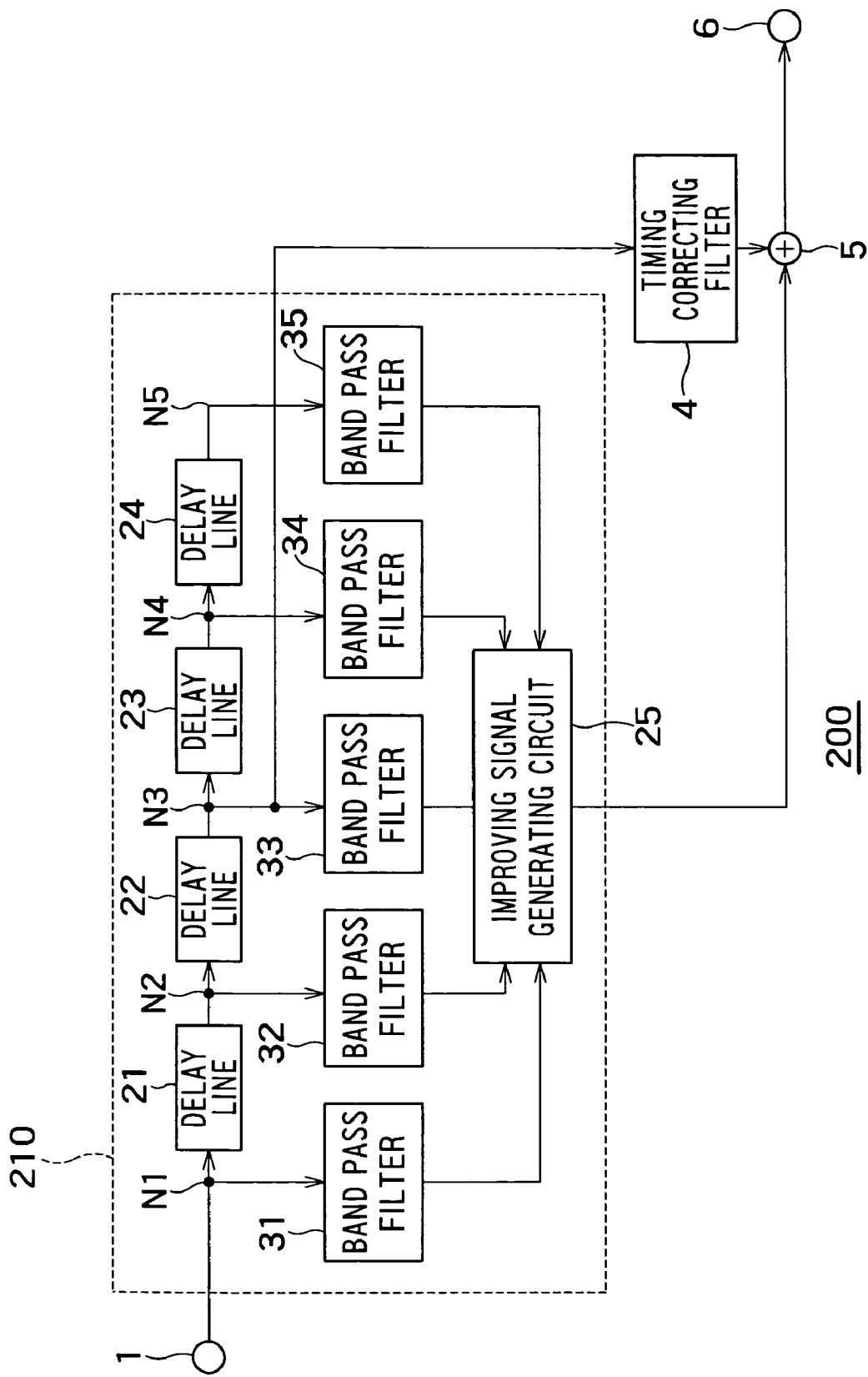
FIG. 5 is a block diagram of a video signal improving circuit 200 according to a second embodiment of the present invention.

FIG. 5 is a block diagram of a video signal improving circuit 200 according to a second embodiment of the present invention. The video signal improving circuit 200 is different from the first embodiment in that the former is provided with band-limiting filters 31 to 35 instead of the band-limiting filter 3. The band-limiting filters 31 to 35 are provided inside a transient improving circuit 210, and the transient improving circuit 210 is different from the transient improving circuit 2 shown in FIG. 1 in this point.

The band-limiting filters 31 to 35 are connected between the node N1 and the improving signal producing circuit 25, between the node N2 and the improving signal producing circuit 25, between the node N3 and the improving signal producing circuit 25, between the node N4 and the improving signal producing circuit 25, and between the node N5 and the improving signal producing circuit 25, respectively. The other constituent elements of the second embodiment may be similar to those of the first embodiment. Each of the band-limiting filters 31 to 35 may be either of a high pass filter, a band pass filter, and a low pass filter like the band-limiting filter 3.

In this embodiment, the band-limiting filters 31 to 35 perform band-limitation on the original video signal and the first to fourth delayed video signals before producing an improving signal. Thereby, this embodiment can achieve an advantage or merit similar to the first embodiment.

(Third Embodiment)

Figure 6:
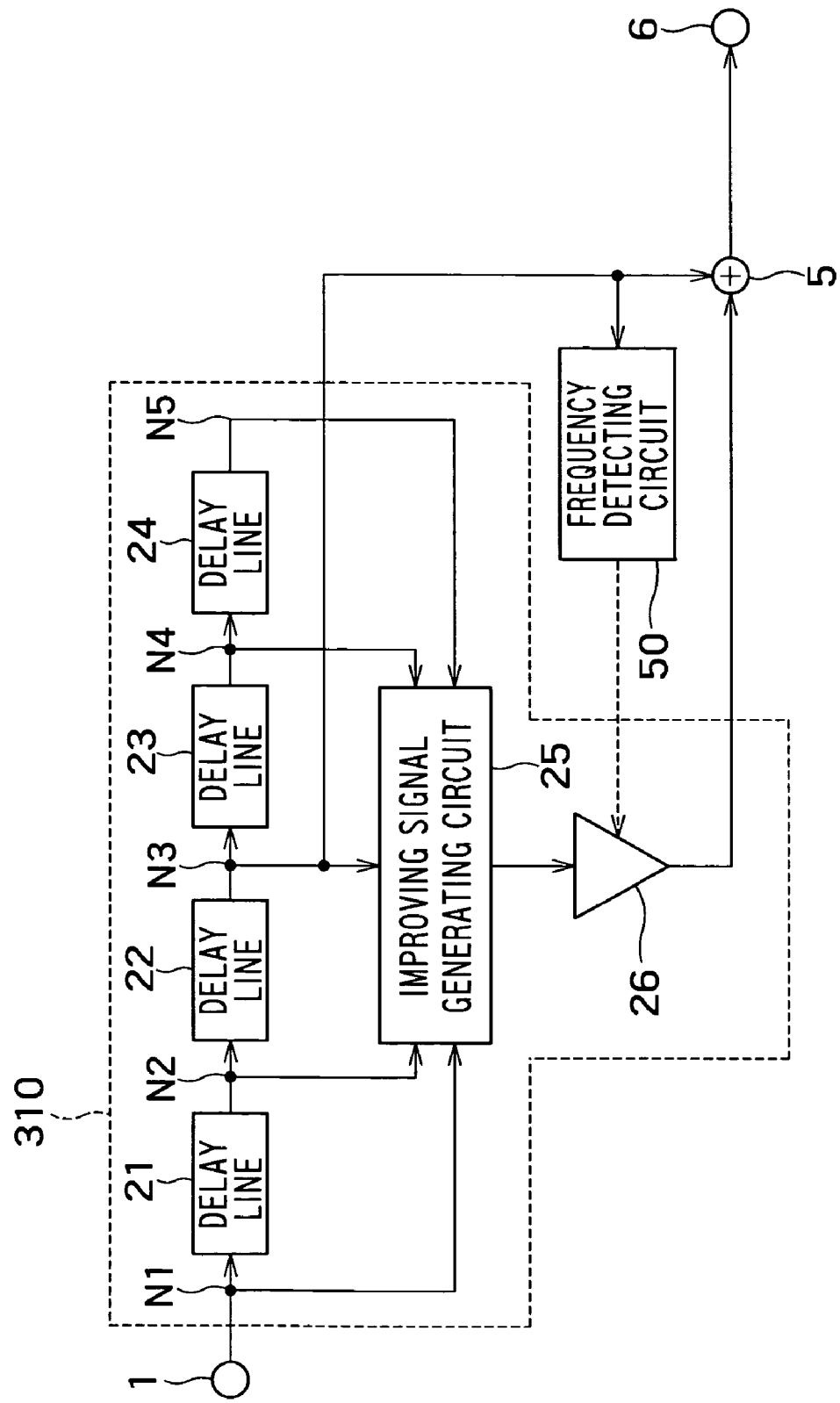
FIG. 6 is a block diagram of a video signal improving circuit 300 according to a third embodiment of the present invention.

FIG. 6 is a block diagram of a video signal improving circuit 300 according to a third embodiment of the present invention. The video signal improving circuit 300 is different from the video signal improving circuit 100 of the first embodiment in that the former is provided with a gain control circuit 26 and a frequency detecting circuit 50. The gain control circuit 26 is provided inside a transient improving circuit 310, and the transient improving circuit 310 is different from the transient improving circuit 2 shown in FIG. 1 in this point.

The gain control circuit 26 is connected between the improving signal producing circuit 25 and the adder 5. The frequency detecting circuit 50 is connected between the node N3 and the gain control circuit 26. A gain (an improving amount) of the gain control circuit 26 is fixed or controlled by I$^2$CBUS or the like. When control is performed by I$^2$CBUS, image evaluation is performed and a gain is set based upon the evaluation result. The gain of the gain control circuit 26 can be modified based upon a frequency detected by the frequency detecting circuit 50. For example, the frequency detecting circuit 50 detects a frequency of the second delayed video signal, so that, when the detected frequency is lower than a preset threshold frequency, the gain of the gain control circuit 26 is reduced.

Figure 7:
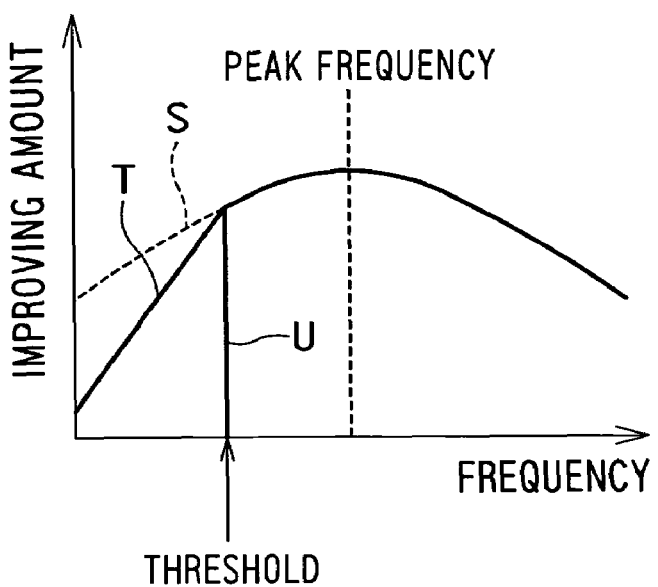
FIG. 7 is a graph showing an improving amount of an improving signal outputted from the gain control circuit 26.

FIG. 7 is a graph showing an improving amount of an improving signal outputted from the gain control circuit 26. A broken line S indicates an improving amount obtained when the frequency detecting circuit 50 is not provided, and a solid line T and U indicates an improving amount obtained when the gain of the gain control circuit 26 is reduced. The frequency detecting circuit 50 may gradually reduce the gain of the gain control circuit 26 according to lowering of the frequency of the second delayed video signal, such as the solid line T. The frequency detecting circuit 50 may reduce the gain of the gain control circuit 26 down to almost zero when the frequency of the second delayed video signal is lower than the threshold, such as the solid line U. FIG. 7 shows the gain of the gain control circuit 26 in a low frequency band lower than the peak frequency, but such a constitution may be employed that the gain of the gain control circuit 26 in a high frequency band exceeding the peak frequency is reduced.

Figure 8:
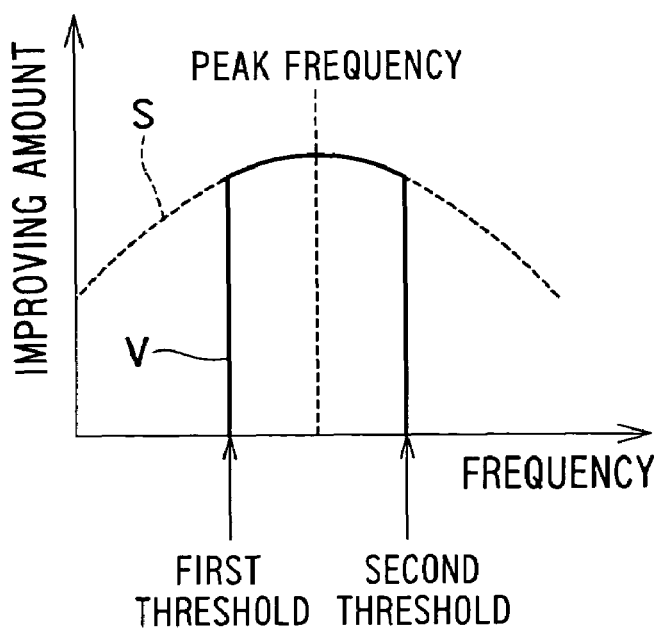
FIG. 8 is a graph showing an improving amount obtained when the gain of the gain control circuit 26 is reduced in both of a low frequency band lower than the peak frequency and a high frequency band exceeding the peak frequency.

FIG. 8 is a graph showing an improving amount obtained when the gain of the gain control circuit 26 is reduced in both of a low frequency band lower than the peak frequency and a high frequency band exceeding the peak frequency. As shown with a solid line V in FIG. 8, the frequency detecting circuit 50 can reduce the gain of the gain control circuit 26 down to almost zero when the frequency of the second delayed video signal becomes lower than a first threshold and when the frequency of the second delayed video signal becomes higher than a second threshold.

This embodiment can achieve an advantage similar to that of the first embodiment. Further, since the video signal improving circuit 300 of this embodiment can reduce the gain of the gain control circuit 26 to almost zero on reaching the first threshold and the second threshold, jitters or noises present in a frequency band lower than the first threshold or a frequency band higher than the second threshold can be completely prevented from being enhanced.

Incidentally, the gain control circuit 26 may be constituted as a circuit for controlling an improving amount inside the improving signal producing circuit 25. In this case, the circuit may be used instead of the gain control circuit 26.

(Fourth Embodiment)

Figure 9:
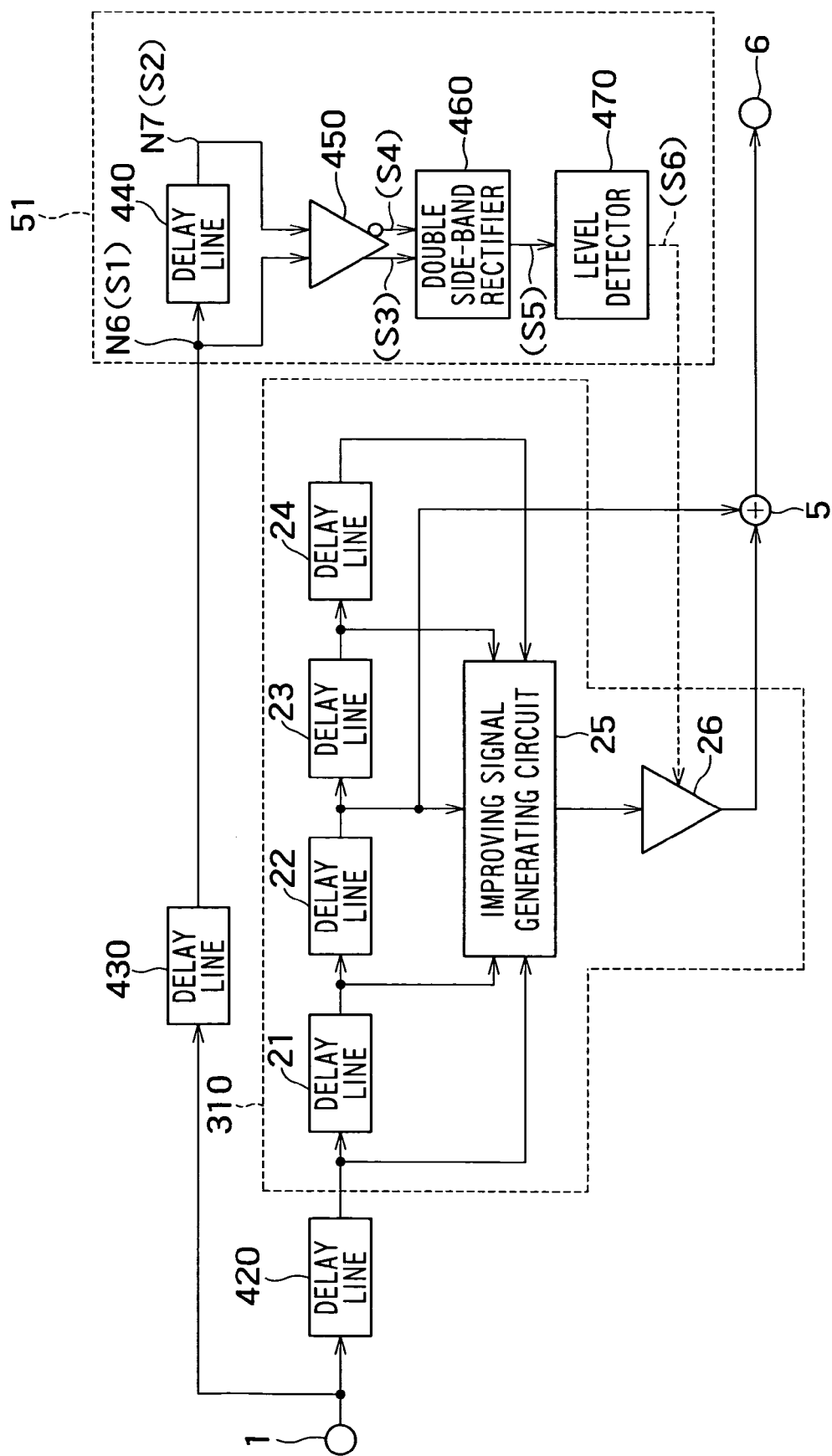
FIG. 9 is a block diagram of a video signal improving circuit 400 according to a fourth embodiment of the present invention.
Figure 10:
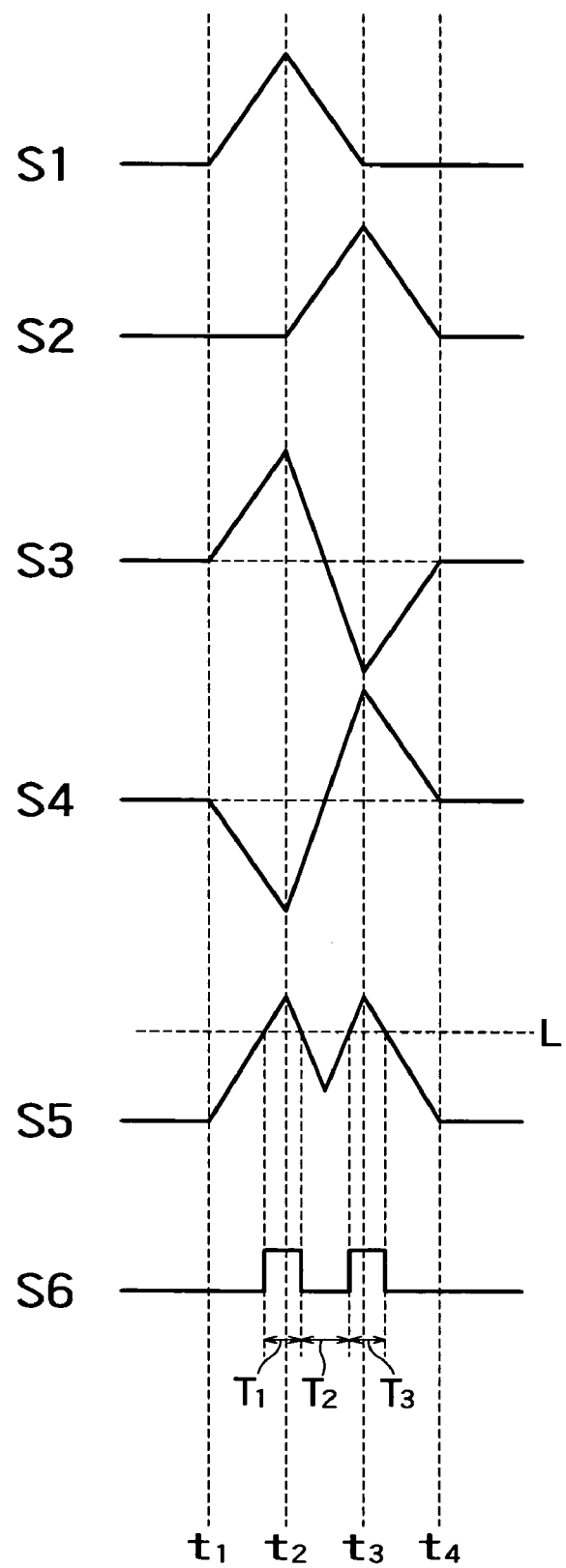
FIG. 10 is a timing chart of an output signal S1 to S6 when the video signal is a high frequency signal.
Figure 11:
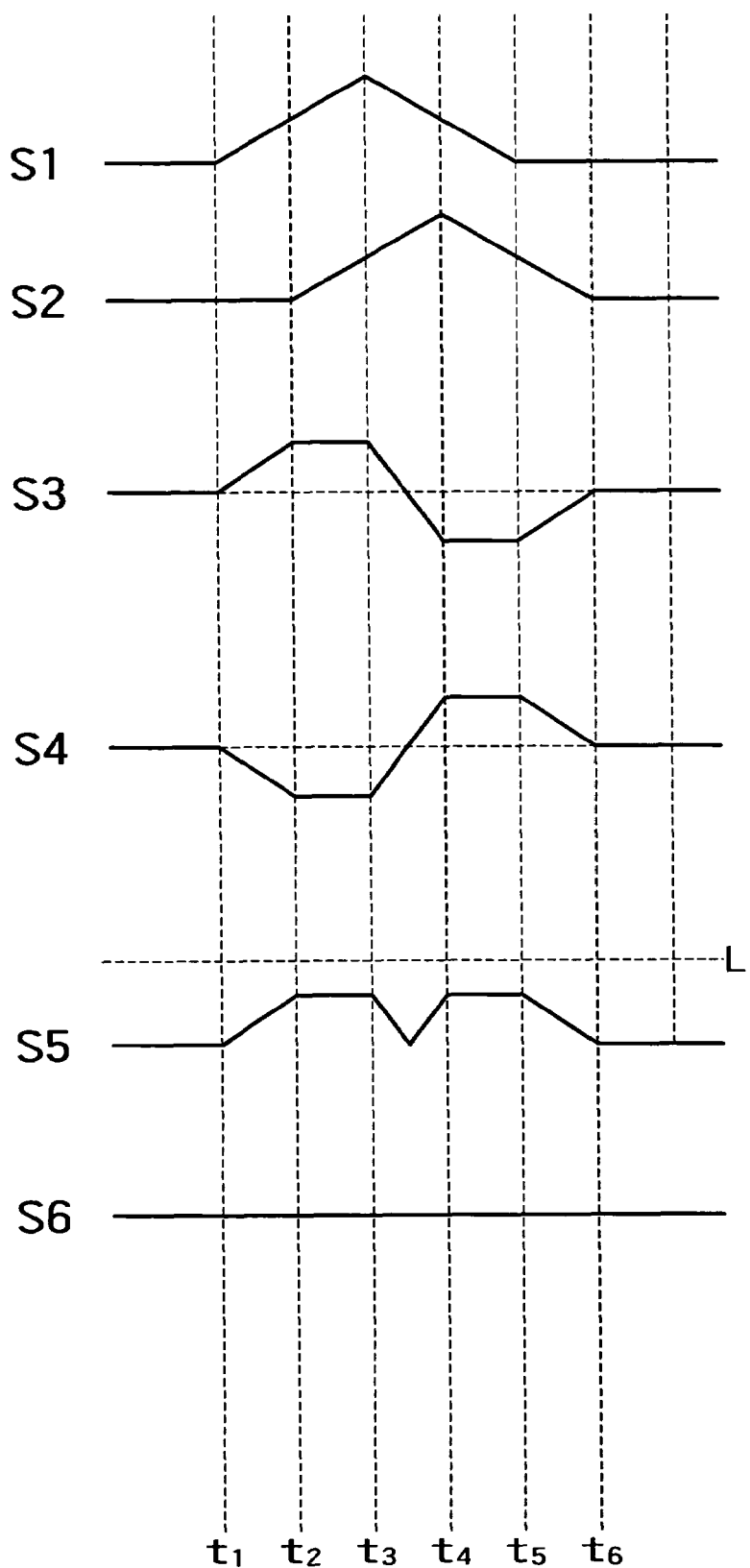
FIG. 11 is a timing chart of an output signal S1 to S6 when the video signal is a low frequency signal.

FIG. 9 is a block diagram of a video signal improving circuit 400 according to a fourth embodiment of the present invention. FIG. 10 is a timing chart of signals S1 to S6 obtained when a video signal has a relatively high frequency. FIG. 11 is a timing chart of signals S1 to S6 obtained when a video signal has a relatively low frequency.

The video signal improving circuit 400 is different from the video signal improving circuit 300 according to the third embodiment in that the former is provided with delay lines 420, 430, and 440, a comparing circuit 450, a double side-band rectifier 460, and a level detector 470. However, the video signal improving circuit 400 is similar to the video signal improving circuit 300 according to the third embodiment in that the former detects the frequency of a video signal, thereby controlling the gain of the gain control circuit 26. The frequency detecting circuit 51 includes therein the delay line 440, the comparing circuit 450, the double side-band rectifier 460, and the level detector 470.

The delay lines 420 and 430 are provided for adjusting a delay time in a signal line producing an improving signal and a delay time in signal line for detecting a frequency of a video signal. The delay line 440 is connected between nodes N6 and N7 to delay the video signal. A video signal at the node N6 is represented as S1 and a video signal at the node N7 is represented as S2. As shown in FIG. 10, the signal S2 is delayed from the signal S1 by an amount corresponding to passing of the signal S2 through the delay line 440.

Two inputs of the comparing circuit 450 are connected to the nodes N6 and N7 which are inputted with the signals S1 and S2. The comparing circuit 450 calculates a difference between the signals S1 and S2. In detail, the comparing circuit 450 calculates (S1-S2) to output a non-inverted signal S3 and an inverted signal S4. The waveforms of the signals S3 and S4 are shown in FIG. 10.

The double side-band rectifier 460 connected to outputs of the comparing circuit 450 to be inputted with the signals S3 and 54. The double side-band rectifier 460 detects the maximum value in the signals S3 and 54 to generate a signal S5. The waveform of the signal S5 is shown in FIG. 10.

The level detector 470 is connected between the double side-band rectifier 460 and the gain control circuit 26 to be inputted with the signal S5. The level detector 470 stores therein a predetermined detection level L in advance to compare the signal S5 and the detection level L with each other. When the signal S5 exceeds the detection level L, the level detector 470 outputs H (high), and when the signal S5 is lower than the detection level L, the level detector 470 outputs L (low). At this time, the waveform of an output signal S6 of the level detector 470 is shown in FIG. 10.

As shown in FIG. 11, when the frequency of the video signal is low, the wavelengths of the signals S1 and S2 become long. The peak of the signal S1 corresponds to an ascending slope portion of the signal S2, and the peak of the signal S2 corresponds to a descending slope portion of the signal S1, respectively. Therefore, the peaks of the signals S1 and S2 are cancelled by taking a difference between the signals S1 and S2, as shown with the signals S3 and S4. Accordingly, the amplitude value is made small as compared with the case that the video signal has a high frequency. As a result, when the video signal has a low frequency, the signal S5 does not exceed the detection level L and the signal S6 maintains L (low).

Thus, the video signal improving circuit 400 of this embodiment can detect a frequency of a video signal. For example, when the signal S5 is lower than the detection level L, the gain of the gain control circuit 26 is made zero and when the signal S5 exceeds the detection level L, the gain of the gain control circuit 26 is increased. Thereby, this embodiment can provide a characteristic as such shown by a curve U in FIG. 7. On the contrary, such a constitution may be employed that, when the signal S5 exceeds the detection level L, the gain of the gain control circuit 26 is made zero, and when the signal S5 is lower than the detection level L, the gain of the gain control circuit 26 is increased. With such a constitution, the video signal improving circuit 400 of this embodiment can cut a video signal belonging to a frequency band higher than the peak frequency.

Further, the frequency may be determined depending on periods T1 and T3 where a signal S6 shown in FIG. 10 is H (high), or a period T2 between the periods T1 and T3 where the signal S6 is L (low). In this case, since the frequency of a video signal can be detected in an analog manner, the video signal improving circuit 400 of this embodiment can provide a characteristic as such shown by a curve T in FIG. 7.

By changing the delay amount in the delay line 440 or the detection level L in the level detector 470, the frequency (the threshold in FIG. 7) which reduces the gain of the gain control circuit 26 can be changed.

(Fifth Embodiment)

Figure 12:
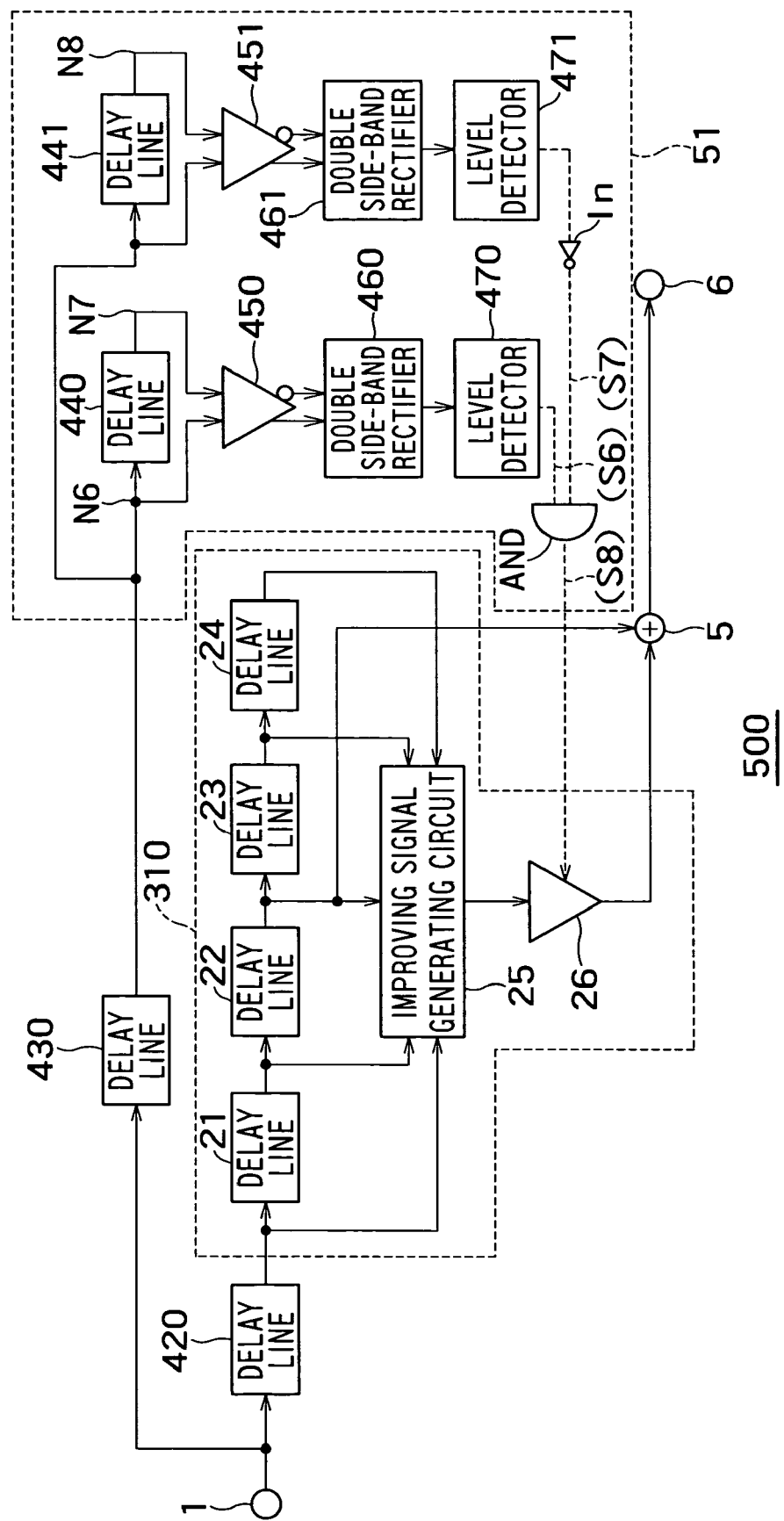
FIG. 12 is a block diagram of a video signal improving circuit 500 according to a fifth embodiment of the present invention.

FIG. 12 is a block diagram of a video signal improving circuit 500 according to a fifth embodiment of the present invention. This embodiment is different from the video signal improving circuit 400 of the fourth embodiment in that the former further comprises a delay line 441, a comparing circuit 451, a double side-band rectifier 461, and a level detector 471 inside a frequency detecting circuit shown by a broken line. The frequency detecting circuit 51 further includes therein the delay line 441, the comparing circuit 451, the double side-band rectifier 461, and the level detector 471. For example, the delay line 441, the comparing circuit 451, the double side-band rectifier 461, and the level detector 471 are used for lowering a video signal belonging to a high frequency band, while the delay line 440, the comparing circuit 450, the double side-band rectifier 460, and the level detector 470 are used for lowering a video signal belonging to a low frequency band.

For this end, delay amounts in the delay lines 440 and 441 are made different from each other, or the detection levels L in the level detectors 470 and 471 are made different from each other. Thereby, an output signal S6 of the level detector 470 and an output signal S7 of the level detector 471 become H (high) at their frequencies different from each other. The signal S6 and an inverted signal of the signal S7 are inputted into an AND gate AND an output signal S8 of the AND gate AND is supplied to the gain control circuit 26.

This embodiment can provide a characteristic such as shown by a curve V in FIG. 8 by setting the delay line 440, 441 or the detection level L properly. For example, the delay line 440, 441, or the detection level L is set such that, when the frequency of a video signal is lower than the first threshold, both the signals S6 and S7 are made L (low). At this time, since the signal S8 is L (low), the gain of the gain control circuit 26 is decreased. The delay line 440, 441, or the detection level L is set such that, when the frequency of a video signal is higher than the first threshold and lower than the second threshold, the signal S6 is made H (high) and the signal S7 is made L (low). At this time, since the signal S8 is H (high), the gain of the gain control circuit 26 is increased. Further, the delay line 440, 441, or the detection level L is set such that, when the frequency of a video signal is higher than the second threshold, both the signals S6 and S7 is made H (high). At this time, since the signal S8 is L (low), the gain of the gain control circuit 26 is decreased. Thus, this embodiment can provide a characteristic such as shown by a curve V in FIG. 8.

(Sixth Embodiment)

Figure 13:
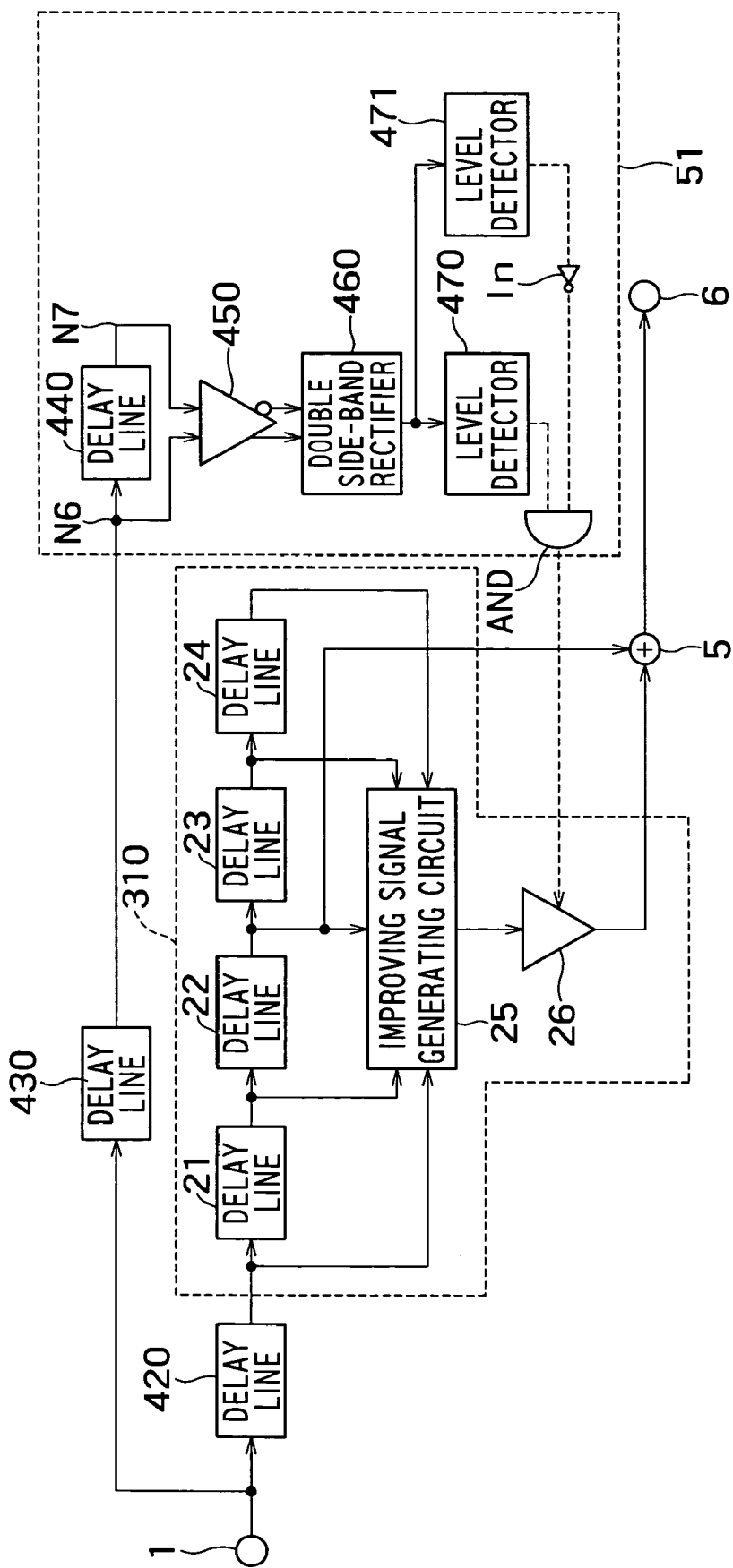
FIG. 13 is a block diagram of a video signal improving circuit 600 according to a sixth embodiment of the present invention.

FIG. 13 a block diagram of a video signal improving circuit 600 according to a sixth embodiment of the present invention. The video signal improving circuit 600 is different from the video signal improving circuit 500 of the fifth embodiment that the former is not provided with the delay line 441, the comparing circuit 451, and the double side-band rectifier 461 but with the level detector 471. The frequency detecting circuit 51 includes therein the level detector 471, but does not include the delay line 441, the comparing circuit 451, and the double side-band rectifier 461.

Since the video signal improving circuit 600 does not have the delay line 441, the signals S6 and S7 can not be controlled by the delay amount of a video signal based upon the frequency of the video signal. However, since the video signal improving circuit 600 is provided with the level detectors 470 and 471, the signals S6 and S7 can be controlled by making the detection levels L in these level detectors different from each other based upon the frequency of the video signal.

This embodiment has an advantage or merit similar to that in the fifth embodiment. Further, this embodiment can be reduced in circuit scale as compared with the fifth embodiment.

The invention claimed is:

1. A video signal improving circuit comprising:
an input section which receives a video signal;
a delay circuit which delays the video signal to generate a plurality of delayed video signals which have delayed times different from one another;
an improving signal producing circuit which generates, as an improving signal, an improving amount for performing a transient improvement on the video signal based upon an original video signal before delay and the plurality of delayed video signals;
a band-limiting filter which performs a frequency band limitation on the improving signal;
a timing correcting circuit which causes timings of any one of the plurality of delayed video signals and the improving signal which has passed through the band-limiting filter to match with each other; and
an adder which adds the improving signal which has passed through the band-limiting filter to the delayed video signal which has passed through the timing correcting circuit.

2. The video signal improving circuit according to claim 1, wherein the timing correcting circuit delays an inputted delayed video signal from among the plurality of delayed video signals.

3. The video signal improving circuit according to claim 2, wherein the timing correcting circuit receives a delayed video signal having a delay amount corresponding to an intermediate value between the original video signal and a delayed video signal which has been delayed the most from among the plurality of delayed video signals.

4. The video signal improving circuit according to claim 1, wherein the timing correcting circuit receives a delayed video signal having a delay amount corresponding to an intermediate value between the original video signal and a delayed video signal which has been delayed the most from among the plurality of delayed video signals.

\* \* \* \* \*